United States Patent
Debashis et al.

(10) Patent No.: US 12,457,910 B2
(45) Date of Patent: Oct. 28, 2025

(54) MAGNETOELECTRIC SPIN-ORBIT DEVICE WITH IN-PLANE AND PERPENDICULAR MAGNETIC LAYERS AND METHOD OF MANUFACTURING SAME

(71) Applicant: Intel Corporation, Santa Clara, CA (US)

(72) Inventors: Punyashloka Debashis, Hillsboro, OR (US); Chia-Ching Lin, Portland, OR (US); Hai Li, Portland, OR (US); Dmitri Evgenievich Nikonov, Beaverton, OR (US); Ian Alexander Young, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 728 days.

(21) Appl. No.: 17/685,053

(22) Filed: Mar. 2, 2022

(65) Prior Publication Data
US 2023/0284538 A1    Sep. 7, 2023

(51) Int. Cl.
| | |
|---|---|
| H10N 52/00 | (2023.01) |
| G11C 11/16 | (2006.01) |
| G11C 11/18 | (2006.01) |
| H01F 10/32 | (2006.01) |
| H03K 19/18 | (2006.01) |
| H10B 61/00 | (2023.01) |
| H10N 50/85 | (2023.01) |
| H10N 52/01 | (2023.01) |

(52) U.S. Cl.
CPC ......... *H10N 52/00* (2023.02); *G11C 11/1673* (2013.01); *G11C 11/1675* (2013.01); *G11C 11/18* (2013.01); *H01F 10/3268* (2013.01); *H01F 10/3286* (2013.01); *H03K 19/18* (2013.01); *H10B 61/22* (2023.02); *H10N 52/01* (2023.02); *H01F 10/329* (2013.01); *H10N 50/85* (2023.02)

(58) Field of Classification Search
CPC .............................. G11C 11/161; H10B 61/22
See application file for complete search history.

(56) References Cited

U.S. PATENT DOCUMENTS

| | | | | |
|---|---|---|---|---|
| 9,503,085 B1 * | 11/2016 | Bird | ................... | H03K 19/0008 |
| 2009/0067224 A1 * | 3/2009 | Hochstrat | .............. | H10N 50/85 |
| | | | | 365/158 |
| 2016/0225890 A1 * | 8/2016 | Datta | ..................... | H10N 50/10 |
| 2017/0093398 A1 * | 3/2017 | Bird | ..................... | H03K 19/21 |
| 2021/0242395 A1 * | 8/2021 | Wang | ..................... | H10N 50/80 |

* cited by examiner

*Primary Examiner* — Evren Seven
(74) *Attorney, Agent, or Firm* — Alliance IP, LLC

(57) ABSTRACT

A spin orbit logic device includes: a first electrically conductive layer; a layer including a magnetoelectric material (ME layer) on the first electrically conductive layer; a layer including a ferromagnetic material with in-plane magnetic anisotropy (FM layer) on the ME layer; a second electrically conductive layer on the FM layer; a layer including a dielectric material on the second electrically conductive layer (coupling layer); a layer including a spin orbit coupling material (SOC layer) on the coupling layer; and a layer including a ferromagnetic material with perpendicular magnetic anisotropy (PMA layer) on the SOC layer.

25 Claims, 6 Drawing Sheets

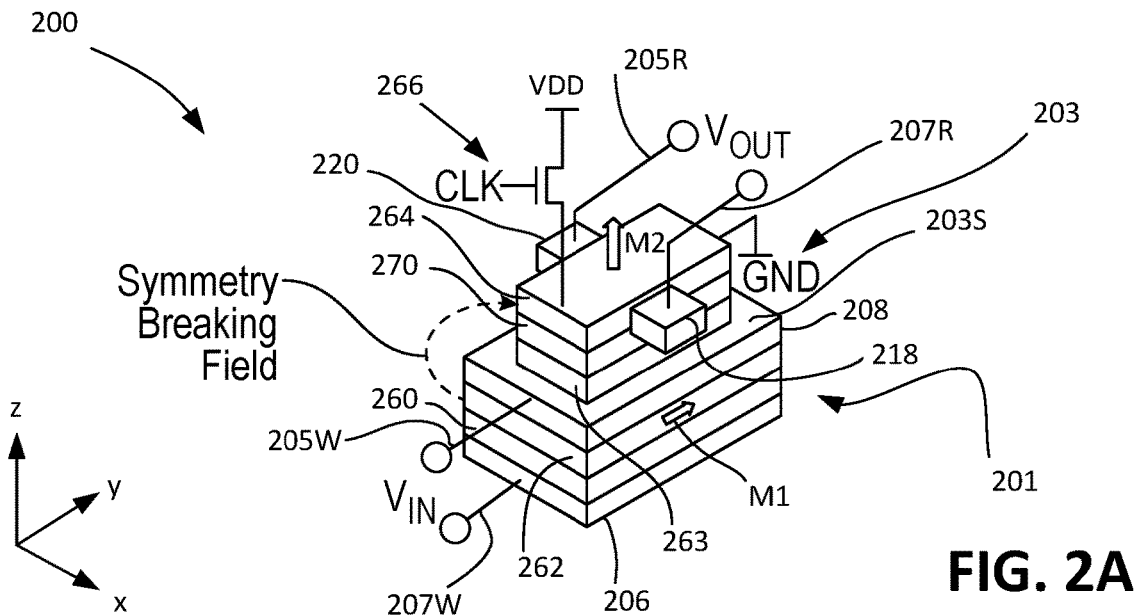
FIG. 2A
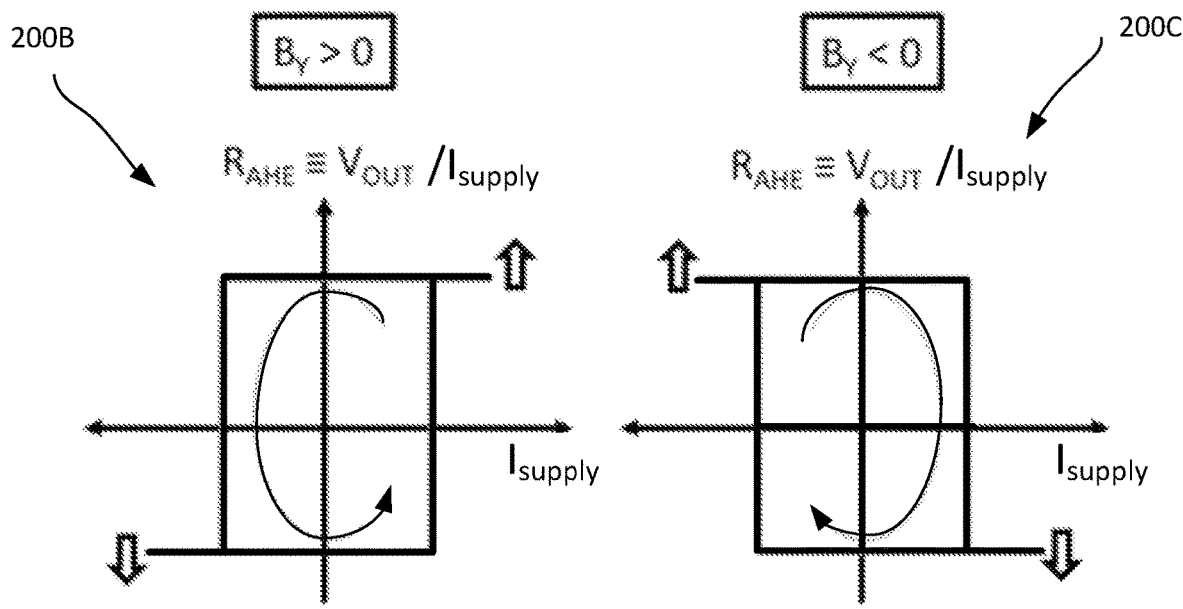
FIG. 2B
FIG. 2C

US 12,457,910 B2

MAGNETOELECTRIC SPIN-ORBIT DEVICE WITH IN-PLANE AND PERPENDICULAR MAGNETIC LAYERS AND METHOD OF MANUFACTURING SAME

TECHNICAL FIELD

This disclosure relates generally to spin orbit coupling devices.

BACKGROUND

Spintronics is the study of intrinsic spin of the electron in solid-state devices. Spintronic logic devices are integrated circuit devices that use a physical variable of spin, or equivalently magnetization, as a computation variable. Such variables can be non-volatile (i.e., preserving a computation state when the power to an integrated circuit is switched off). Non-volatile logic can improve the operating energy and computational efficiency of a device by allowing architects to put a processor to into sleep states more often and therefore reduce energy consumption. Switching of magnetization can be performed with a lower voltage than switching a transistor. This further contributes to lowering the operating energy. Existing spintronic logic devices generally involve complex manufacturing operations, and present a relatively substantial footprint within a final system incorporating the same.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 2A illustrates a perspective view of a perpendicular MESO (PMESO) inverter device in accordance with an embodiment.

FIG. 2B illustrates a typical plot of the output voltage per unit current in the anomalous Hall effect at positive external magnetic field.

FIG. 2C illustrates a typical plot of the output voltage per unit current in the anomalous Hall effect at negative external magnetic field.

DESCRIPTION OF EMBODIMENTS

Figure 1:
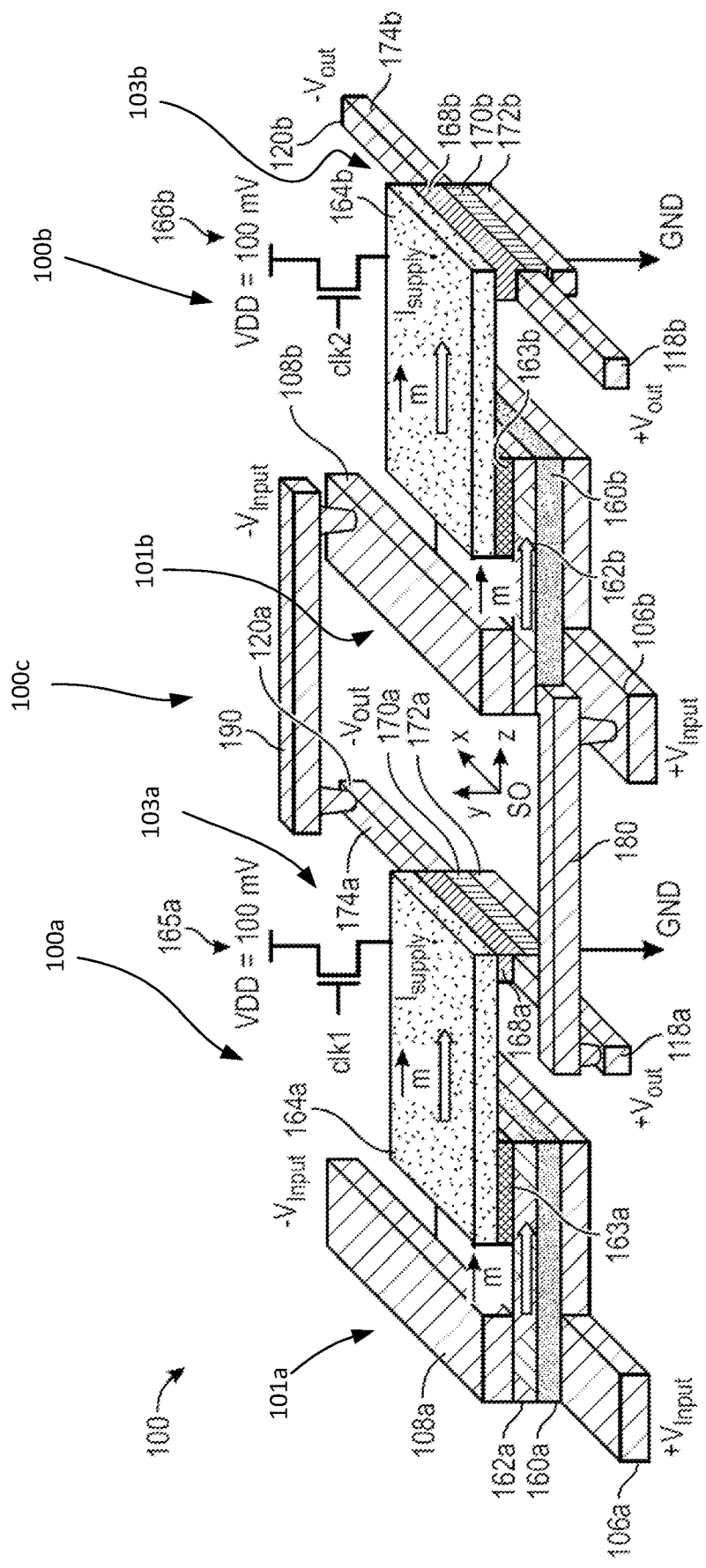
FIG. 1 illustrates a perspective view of a prior art logic circuit, two cascaded magnetoelectric spin-orbit (MESO) inverters.

The magnetoelectric spin orbit (MESO) device has been proposed as one of the leading candidates for super energy efficient beyond complementary metal oxide semiconductor (CMOS) logic devices. Embodiments propose an alternative method to read out the state of a MESO device that enables use of perpendicular magnetic anisotropy (PMA) magnets and the anomalous Hall effect (AHE) for improved readout voltage.

Current MESO devices similar to the ones shown in FIG. 1 to be described below, rely on spin orbit coupling materials for a spin to charge conversion. Such structures have a small spin to charge conversion efficiency for the most common heavy metal systems and hence produce a small output voltage $V_{out}$. In addition, MESO devices of the prior art are complex to manufacture, and present a relatively large footprint that makes the cascading of multiple such devices lead to an inefficient use of system real estate.

Embodiments propose to use of the anomalous Hall effect to read out the state of a MESO device. Embodiments rely on the use of a perpendicular magnetic anisotropy (PMA) FM layer in the output module/read module (or read unit) to ease the coupling requirements with the input module/write module (or write unit). According to some embodiments, a perpendicular MESO (PMESO) device is provided which includes a magnetoelectric capacitor unit including a magnetoelectric (ME) layer and a ferromagnetic (FM) layer thereon. An input voltage $V_{in}$ may be applied across the ME layer and the FM layer to switch a ferroelectric polarization within the ME layer by 180 degrees. The above in turn switches the magnetization M1 of an adjacent in-plane magnetic anisotropy (IMA) ferromagnet (FM) layer. The output module of MESO consists of a perpendicular magnetic anisotropy magnet (PMA) that is magnetically coupled but electrically isolated from the first FM layer, and follows the switching of the first FM.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims. In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Some embodiments provide an integrated circuit structure that includes a spin orbit logic SOL device in which a material whose state modulates or influences an output spin orbit (SO) charge current of the SOL circuit is ferroelectric rather than ferromagnetic. In this manner, embodiments advantageously open up a plethora of choices of ferroelectric materials to be used in SOL devices, as opposed to state of the art SOL devices that function based on multiferroic materials combined with ferromagnetic materials. The latter does not present as many options in terms of types and availability of materials. In addition, according to some embodiments, a SOL device operates faster than a ferromagnetically switched spin orbit logic device, and is further simpler and less expensive to manufacture.

FIG. 1 illustrates an integrated circuit structure 100 including a cascaded magnetoelectric spin orbit logic (MESO) circuit having a set of MESO devices 100a and 100b connected to one another in a cascaded fashion. An integrated circuit device assembly may include one or more of the integrated circuit structures of FIG. 1, and may further include a number of such MESO circuits cascaded with one another in the same manner as shown in FIG. 1. The shown MESO devices may be structurally identical to one another, and electrically connected by way of a non-magnetic electrical conductor bridge 100c including non-magnetic electrical conductors 180 and 190. The description provided below will therefore relate to either of MESO device 100a or 100b, and/or to their respective components, by referring to the same in the alternative as, for example, MESO device 100a/100b. In addition, in the description of FIG. 1, "vertical" refers to they dimension, and "horizontal" refers to the x dimension or the z dimension, which directions are shown by way of the coordinate system provided in FIG. 1.

MESO device 100a/100b includes a magnetoelectric (ME) capacitor region 101a/101b, and a spin orbit module (SOM) region 103a/103b magnetically coupled together. The ME capacitor region 101a/101b includes two non-magnetic electrical conductors 106a/106b (which is to provide a positive input bias or voltage, $V_{in}+$) and 108a/108b (which is to provide a negative input bias or voltage, $V_{in}-$), between which are provided a layer including a multiferroic material (ME layer) 160a/160b connected to $V_{in}-$, and a layer including a first ferromagnetic material (FM layer) 162a/162b.

The ME capacitor 101a/101b may be charged and discharged by virtue of the bias applied between $V_{in}+$ and $V_{in}-$. A charging and discharging of the ME capacitor region corresponds to a change in the information state of the ME capacitor. The ME capacitor region 101a/101b is coupled to the SOM 103a/103b by way of a non-magnetic electrical conductor structure including non-magnetic electrical conductors 180 and 190.

SOM 103a/103b includes a second FM layer 164a/164b disposed directly on a spin orbit coupling stack (SOC stack). The SOC stack includes spin coherent layer 168a/168b and spin orbital coupling layer 170a/170b. Spin coherent layer 168a/168b, which in turn is disposed directly on a spin orbital coupling layer 170a in contact with a SOM non-magnetic electrical conductor 172a. SOM 103a/103b provides a structure is to be subjected to a supply current $I_{supply}$ supplied by way of a transistor, such as the N-type Metal-Oxide-Semiconductor Field-Effect (NMOS) transistor 166a/166b, and running in a direction between $V_{dd}$ and Ground (Gnd). The SOM structure 103a/103b first converts the supply current $I_{supply}$ to a spin current by virtue of $I_{supply}$ contacting second FM layer 164a/164b, and thereafter converts the spin current to an output/spin orbital (SO) charge current $I_c$ flowing horizontally in the positive or negative x direction depending on the magnetization direction of second FM layer. Output/spin orbital (SO) charge current $I_c$ of MESO device 100a generates a bias between $V_{in}-$ and $V_{in}+$ of cascaded MESO device 100b.

Second FM layer 164a is coupled to the first FM layer 162a by virtue of a coupling layer 163a. Coupling layer may include one or more of $Fe_3O_4$, $CoFe_2O_4$, EuO, $Fe_2O_3$, $Co_2O_3$, $Co_2FeO_4$, $Ni_2FeO_4$, $(Ni,Co)_{1+2x}Ti1-xO_3$, yttrium iron garnet (YIG)=$Y_3Fe_5O_{12}$, ($MgAl_{0.5}Fe_{1.5}O_4$, MAFO), or (NiAFO, $NiAl_xFe_{2-x}O_4$). The coupling layer is to electrically insulate the ME capacitor from the SOM (especially because of separate clocking of cascaded MESO devices as suggested for example by first and second clocking signals clk1 and clk2) while providing magnetic coupling between the first FM layer 162a and the second FM layer 164a. Coupling layer 163a serves to isolate the ME capacitor from the SOM electrically, especially because of the separate clocking of the MESO devices as noted above.

Transistor 166a/166b, clocked using a clock signal clk1/clk2 at its gate, is to provide the supply current $I_{supply}$ by virtue of a bias between $V_{dd}$ and Ground (Gnd) as shown. $I_{supply}$ is supplied vertically, in the minus y direction, to second FM layer 164a/164b. $I_{supply}$ will have no spin polarization before reaching the second FM layer. By virtue of contacting the second FM layer however, a spin current is generated from the supply current, the spin current having a spin direction based on a magnetization direction in the second FM layer. In FIG. 1, magnetization direction is shown by way of arrows denoted "m." The spin current will pass through the spin coherent layer 168a/168b and reach the interface between the spin coherent layer 168a/168b and the spin orbital coupling (SO coupling) layer 170a/170b. At the latter interface, the spin current will be converted into the output/spin orbital (SO) charge current $I_c$. The SO charge current $I_c$ flow creates a bias $V_{out}+$ at contact 118a and a bias $V_{out}-$ at contact 120a.

Because of the magnetic coupling provided by the coupling layer 163a/163b, first FM layer 162a/162b and second FM layer 164a/164b will have magnetization directions that are the same when a bias is applied to the ME capacitor 100a/100b. The direction of magnetization m, in the shown configuration, will be in the negative or positive z direction, since, in general, and unless other factors are at play, a magnetization direction in an object tends to be along a direction corresponding to a longest dimension of the object, in the shown case, in the z direction. When the magnetization direction m is changed, the functionality of the SOM is changed as well. As a result, with a change in the direction of magnetization of FM layer 162a/162b and second FM layer 164a/164b, the direction of the SO charge current $I_c$ can change as well. Therefore, changing the ME capacitor state will change the direction of the SO charge current $I_c$.

SOM 103a/103b operates based on spintronic phenomena, including a spin hall effect (SHE) and/or a Rashba-Edelstein effect (including inverses of each of the latter effects). SHE is based on the use of heavy metals to convert a spin current into a charge current, and vice versa in the inverse case.

Referring to the SOM 103a/103b, in the case of inverse SHE, $I_{supply}$ going into the second FM layer 164a/164b will polarize the electrons of the supply current $I_{supply}$ and generate a spin polarized current therefrom, where the spin movement of the electrons is based on a direction of magnetization m. Therefore, the SOM 103a/103b is configured to convert the magnetization state of the FM layers into a SO charge current $I_c$.

$I_c$ can serve to charge a capacitor in the next cascaded MESO device by virtue of the generation of a voltage bias between contacts 118a and 120a as shown. Furthermore, it is to be understood that each of the MESO device shown, including 100b, can be used to charge a ME capacitor similar to ME capacitor 101a/101b at the next cascaded MESO device by virtue of the SO charge current $I_c$ that it may generate and the resultant output voltage bias (e.g. at contacts 118b and 120b of MESO device 100b) at its output to form the logic circuit or part of a logic circuit, as shown in FIG. 1.

Since it is possible to transmit charge currents through interconnects without the loss of its magnitude as opposed to pure spin currents, converting a magnetization state of ME capacitor 101a/101b into an ultimate SO charge current will transmit a signal representing the state of the ME capacitor (and this information contained in the same) much more easily than would be transmitted by virtue of spin alone.

Some embodiments provide a perpendicular magnetoelectric spin orbit device including: a first electrically conductive layer; a layer including a magnetoelectric material (ME layer) on the first electrically conductive layer; a layer including a ferromagnetic material with in-plane magnetic anisotropy (FM layer) on the ME layer; a second electrically conductive layer on the FM layer; a layer including a dielectric material on the second electrically conductive layer (coupling layer); a layer including a spin orbit coupling material (SOC layer) on the coupling layer; and a layer including a ferromagnetic material with perpendicular magnetic anisotropy (PMA layer) on the SOC layer.

FIG. 2A illustrates an integrated circuit structure including a perpendicular MESO (PMESO) device 200 according to some embodiments. An integrated circuit structure according to one example embodiment may include the PMESO device of FIG. 2A, and may further include a number of such PMESO devices together forming a circuit similar to the one included in FIG. 3 to be described below.

PMESO device 200 may be configured to be electrically connected by way of a non-magnetic electrical conductor bridge to another similar or identical device in a cascaded fashion, as will be explained in further detail in the context of FIG. 3. In the description of FIG. 2A, as in other figures herein to the extent relevant, "vertical" refers to the z dimension, and "horizontal" refers to the x dimension or the y dimension, which directions are shown by way of the coordinate system provided in FIG. 2A.

PMESO device 200 includes a magnetoelectric (ME) capacitor region 201 (the write unit), and a perpendicular anisotropy ferromagnetic read unit (PMA unit) 203 (the read unit) magnetically coupled together. The ME capacitor region 201 includes two non-magnetic electrical conductors 206 and 208, where a first electrical contact 205W may be coupled to the electrical conductor 206, and a second electrical contact 207W may be coupled to electrical conductor 208. The bias polarity could be switched as between electrical conductors 206 and 208. Between electrical conductors 206 and 208 are provided a multiferroic material, for example a magnetoelectric material (ME layer) 260 closest to electrical conductor 206, and a layer including a first ferromagnetic material, (FM layer) 262 on the ME layer 260. A magnetization direction within FM layer, including its direction, is depicted as M1 in FIG. 2A.

The ME capacitor 201 may be charged and discharged by virtue of the bias applied between electrical contacts 205W and 207W. A charging and discharging of the ME capacitor region corresponds to a change in the information state of the ME capacitor. The bias between electrical conductors 206 and 208 will control a direction of the in-plane magnetization M1 of the FM layer The ME capacitor region 201 is magnetically coupled to but electrically insulated from the PMA unit 203 by way of a coupling layer 263.

Coupling layer 263 between the ME capacitor 201 and the PMA unit 203 serves to electrically insulate/decouple the ME capacitor 201 from the PMA unit 203 while still providing magnetic coupling therebetween. Coupling layer 263 may be made of any dielectric material, and/or of any material that may be used for the coupling layer 163 of the MESO device of FIG. 1. Coupling layer may include a coupling material including any electrical insulator, such as, for example, one or more of silicon dioxide, hafnium dioxide, silicon nitride, and silicon oxynitride.

PMA unit 203 includes PMA layer 264 (a layer including a PMA material) disposed on a spin orbit coupling (SOC) layer 270. A magnetization direction within PMA layer, including its direction, is depicted as M2 in FIG. 2A. Of note, a feature of the PMA unit 203 is that the magnetic layer thereof is configured to provide a magnetization M2 the direction of which is out-of-plane or perpendicular, in either the positive z or the negative z direction, rather than being in-plane as is the case with FM layer. The perpendicular anisotropy of the PMA material of PMA layer 264 may be brought about by bulk or inherent properties of one or more materials used in the PMA layer, an interaction between two or more sublayers of the PMA layer, or a thickness of the PMA material.

PMA unit 203 provides a structure this is to be subjected to a supply current $I_{supply}$ supplied by way of a transistor, such as the N-type Metal-Oxide-Semiconductor Field-Effect (NMOS) transistor 266, and running in a direction between $V_{dd}$ and Ground (Gnd). In the shown embodiment, $I_{supply}$ runs in-plane in the positive y direction, where VDD is coupled to one end of the PMA layer 264, and Gnd is connected to an opposite end of the PMA layer 264 as shown. VDD and Gnd may further be connected, in one variation, in addition to being coupled to the PMA layer 264, to the SOC layer 270. The PMA unit structure 203 converts the supply current $I_{supply}$ flowing in-plane through the PMA layer 264 in the positive y direction to an output charge voltage horizontally in the positive or negative x direction depending on the magnetization direction of the PMA layer. The charge voltage $V_{out}$ thus generated is captured between two electrically conductive structures 218 and 220 that are oriented in the x dimension as shown. Electrical contacts 205R and 207R may be electrically coupled to contacts 218 and 220 respectively to supply the output charge voltage $V_{out}$ to another device, such as, for example, as the yin of another PMESO device similar to PMESO device 200 of FIG. 2A, as will be described in further detail in the context of FIG. 3.

Any of the material layers shown in FIG. 2A may be made of either a single layer, or multiple sublayers, such as repeated sublayers or sublayers of different materials which together form a layer with the noted characteristic, such as PMA layer or a SOC layer.

The SOC layer 270 of the PMA unit 203 operates based on spintronic phenomena, including an anomalous Hall effect (AHE).

The layers of the ME capacitor region 201, for example the ME layer 260, FM layer 262, and electrically conductive layers 206 and 208, may be similar, respectively, to ME layer 160, FM layer 162, and electrically conductive layers 106 and 108 of FIG. 1. Some differences between the prior art device of FIG. 1 and the PMESO device of FIG. 2A include the state of the PMESO device being determined as a result of the anomalous Hall effect (AHE) in part by way of a perpendicular anisotropy of the PMA layer on top of a SOC material, and an interaction of an external symmetry breaking field therewith. Examples of PMA and SOC materials that may be used in the PMESO device of FIG. 2A are provided further below.

AHE describes the fact that when a charge current flows along a ferromagnetic metallic conductor, another electrical current flows perpendicularly to the direction of flow of the charge current due to a magnetization of the ferromagnetic metallic conductor. The effect is originated from a magnetic interaction between the orbital moment of conduction electrons (in this case, of the electrons corresponding to $I_{supply}$) with the spin of localized electrons (in this case, of the spin of localized electrons within the PMA layer 264).

The equilibrium magnetization of a ferromagnetic layer is typically in-plane. However, the interface of the PMA layer 264 may introduce an additional energy term. This additional energy may be large enough to result in the total magnetic energy within the PMA layer being smaller in the perpendicular-to-plane direction. As a result, the direction of the equilibrium magnetization can become perpendicular-to-plane based on the material or materials used in the PMA layer. This effect is called perpendicular magnetic anisotropy (PMA). Under the influence of spin orbit torque from the SOC underlayer, the magnetization direction can preferably point either in +Z or -Z direction, depending upon an external symmetry breaking field, as will be explained in further detail below.

Referring in the context of the above to FIGS. 2B and 2C, the figures show graphs 200B and 200C, which each plot the AHE output signal which is determined by the magnetization direction corresponding to M2 as a function of $I_{supply}$, with $I_{supply}$ corresponding to the current flowing between VDD and Gnd through the PMA layer 264. M2 is represented in the graphs 200B and 200C as RAHE, where RAHE is defined as the AHE output voltage $V_{out}$ divided by current $I_{supply}$. $V_{out}$ is generated between electrical contacts 205R and 207R by virtue of the AHE described above in relation to FIG. 2A, and $I_{supply}$ corresponds to the current flowing between VDD and Gnd. Graphs 200B and 200C show respective hysteresis loops depicting a behavior of M2 versus $I_{supply}$ depending on an external magnetic field By to which the read unit 203 is subjected. By correlates with the symmetry breaking field that helps to bring about the AHE, and corresponds to M1 of the ME capacitor 201 within the FM layer 262. While graph 200B corresponds to By in the positive y direction, graph 200C corresponds to By in the negative y direction. The external magnetic field $B_y$, as suggested by graphs 200B and 200C, affects the behavior of the PMA magnetization direction as a function of $I_{supply}$. In particular, when By changes direction in the y dimension, the hysteresis loop flips, such that a same $I_{supply}$ would generate a M2 in a different direction (i.e. of a different polarity) based on the direction of By.

For a PMA material such as that in PMA layer 264, underlying SOC material of SOC layer 270 generates in-plane spin currents whose polarization is along the x dimension. By itself, the spin current is not sufficient to control the magnetization direction of M2 in the positive z or negative z direction. However, a symmetry breaking field is provided by virtue of M1's influence/$B_y$'s influence on the PMA unit 203. If the symmetry breaking field is a positive along y (corresponding essentially to Br), a hysteresis loop similar to that of FIG. 200B may apply, and if the symmetry breaking field is negative along y, a hysteresis loop similar to that of FIG. 200C may apply. Essentially, M1 influences M2, and in turn influences $V_{out}$ for a same $I_{supply}$.

A control of voltage $V_{in}$ (including its polarity) serves to control M1 and its direction. A control of $V_{in}$ therefore serves to control $V_{out}$ by virtue of M1 generating a symmetry breaking field that affects M2, in this way causing the AHE to control $V_{out}$, as suggested by way of hysteresis loops in graphs 200B and 200C. By using a set or predetermined $I_{supply}$, for example 100 micro Amperes, a switching of the polarity in $V_{in}$ may then change the direction of M1, hence the direction of M2 in the PMA unit 203, and hence the polarity of $V_{out}$. M2 will point in the positive z direction or the negative z direction depending on whether the magnetization of the in-plane, magnetic field M1 is positive or negative. Switching the direction of M2 would then in turn switch the polarity of $V_{out}$ for the same $I_{supply}$. Therefore, $V_{out}$ may be switched by switching yin. As shown in FIGS. 2B and 2C, for a same $I_{supply}$, $V_{out}$ may be positive or negative depending on whether $B_y$ (or M1) is positive or negative.

With respect to structure, a PMESO device according to some embodiments preferably presents a maximum overlap/maximum vertical alignment between the PMA layer 264 and the FM layer 262 in order to maximize the effect of M1 on M2 in terms of a symmetry breaking field. For the overall footprint of a PMESO device according to some embodiments, a full overlap of the PMA unit over the ME capacitor (an overlap as defined by a top plan view of the PMA unit being fully circumscribed within a top plan view of the ME capacitor) would advantageously result in a smaller overall PMESO device 200.

Advantageously, a PMESO device according to embodiments provides for a MESO device that can switch its state faster and with a lower magnitude magnetic field at M1 than a MESO device of the prior art, by virtue of the ability to apply AHE and a symmetry breaking field from M1 within a ME capacitor onto an overlying PMA read unit. Embodiments advantageously provide a structure that allows the application of a relatively small in-plane field M1 in the ME capacitor to control an output voltage at the PMA unit of the same device.

In addition, advantageously, embodiments make possible the provision of a thicker coupling layer 263 between the ME capacitor 201 and the PMA unit 203 as compared with coupling layer 163 of the prior art, where coupling layer 263 may further be made of a larger selection of materials as compared with coupling layer 163 of the prior art. The higher versatility in terms of the thickness of and in the selection of materials available for a coupling layer according to embodiments, such as coupling layer 263, is by virtue of the fact that even a relatively small in-plane magnetic field in the ME capacitor 201 may generate a sufficient symmetry breaking field for the benefit of the PMA unit 203, and hence a minimization of a coupling layer as would be required in the structure of the prior art is not necessary according to embodiments. A thicker coupling layer may increase the longevity of the device, as it may go through more switching cycles of the PMESO before showing degradation as compared with a thinner coupling layer. For example, coupling layer 263 may have a thickness comparable in scale to that of one or more of the PMA layer, the SOC layer, the FM layer or the ME layer. For example, all of the coupling layer, the PMA layer, the SOC layer, the FM layer or the ME layer may have thicknesses on a nanometer scale, and lateral dimensions in a scale of tens to hundreds of nanometers. By way of example, the coupling layer 263 may have a thickness in the z dimension from about 2 nm to about 5 nm, and preferably a thickness of about 3 nm.

With respect to choices of materials for a coupling layer, according to embodiments, since we are not concerned about ferromagnetic coupling as is the case for the prior art, we have a wider variety of coupling materials available (such as a variety of oxides) beyond materials typically used for the coupling layer (such as layer 163) in the prior art.

According to some embodiment, the ME capacitor extends beyond a lateral dimension of the PMA unit in at least one of the x dimension or the y dimension. In the shown embodiment, the ME capacitor 201 extends beyond the lateral dimensions of the PMA unit 203 in both the x dimension and the y dimension. Let us call regions of the ME capacitor 201 extending beyond the lateral dimensions of the PMA unit 203 shelf regions 201S. The shelf region 201S in the y direction in the shown embodiment of FIG. 2A advantageously provides a landing space for the electrical contact 205W to connect to conductive layer 208.

Embodiments are not limited to the PMA unit being centered on top of the ME capacitor as shown in FIG. 2A. Embodiments encompass a PMA unit that is to be within a symmetry breaking field of the ME capacitor. The symmetry breaking field of the ME capacitor would present a specific profile in the three dimensional space, and embodiments include the PMA unit being within a symmetry breaking field as controlled by an input voltage yin, even where the PMA unit may not be disposed on its corresponding ME capacitor.

For example, the PMA unit 203 be at a side region of the ME capacitor such that shelf region 201S is different at one or more sides of the PMA unit pillar. For example, the PMA unit may be positioned to have one or two side walls thereof substantially flush with corresponding side walls of its supporting ME capacitor. Alternatively, because the symmetry breaking field typically presents a special profile in the three dimensional space, the PMA unit may be located such that, in a top plan view thereof, it is neither wholly nor partially coextensive with the ME capacitor.

The PMA unit may include (not shown) a capping layer on the PMA material of the PMA layer to protect the overall device.

The PMA material may include one or more of: a heterostructure including MgO and one or more of: cobalt, iron, or boron. For example the PMA material may include: a cobalt iron boron and MgO heterostructure, or a cobalt platinum super lattice. The PMA material may include a two-dimensional ferromagnetic material, such as $FePS_3$, $Cr_2Ge_2Te_6$, $CrI_3$, $NiPS_3$, $MnPS_3$, or $Fe_3GeTe_2$.

The PMA layer may include MgO at a top side thereof (a side thereof further from the SOC layer, and at least one of cobalt, iron at a bottom side thereof (a side thereof closer to the SOC layer). The MgO may be provided to cause a surface interaction between the same and the underlying material, such as cobalt iron, or cobalt iron boron, to enforce the magnetization M2 to be pointing in an out of plane direction. Thus, MgO provides is energetically favorable for PMA functionality of the underlying material.

The PMA layer is not limited to one including MgO at a top side thereof, but may include one or more materials with respective bulk properties where M2 points out of plane without need for MgO. For example, iron platinum cobalt may have the inherent property of having a magnetization that is perpendicular or out-of-plane.

According to some embodiments, a material of the PMA layer may exhibit PMA functionality based on a thickness of the PMA layer. For example, where the PMA layer includes MgO at a top side thereof and cobalt iron boron at a bottom side thereof, its thickness may, according to an embodiment, be about 1.5 nm or less, in order for its magnetization direction to be perpendicular to the plane to the PMA layer. According to some embodiments, the PMA layer has a thickness less than about 1.5 nm.

If a series of cascaded PMESO devices similar to that of FIG. 2 is placed in magnetometry equipment and the symmetry breaking field of the ME capacitor regions 201 applied thereto, a superconducting quantum interference device sensor may determine the out-of-plane magnetization of the PMA layers of such PMESO devices. In addition, magnetic force microscopy may be used to determine a magnetization direction of a PMA layer at an individual PMESO device level.

The PMA unit may include (not shown) a capping layer on the PMA material to protect the overall device.

The SOC layer may include a SOC material, such as one or more heavy metals, including, for example, tantalum, platinum, or tungsten. The SOC material may include one or more topological insulators, such as bismuth selenide, bismuth telluride, bismuth selenide telluride, or antimony telluride. The SOC material may include a composite 2D materials with a heavy metal, such as tantalum on top of tungsten diselenide. The SOC material may include a 2D material, such as tungsten diselenide, tungsten disulfide, or proximitized graphene.

The SOC layer 270 may include any of: a metal, such as W, Ta, or Pt; topological insulators such as $Bi_2Se_3$, $Bi_2Te_3$, BiSb; or materials containing one or more two dimensional electron gases, such as, LaAlO3/SrTiO3 or Al/KTaO3 interfaces.

The SOC layer may include sublayers, for example one or more sublayers each including a 2D material, and one or more layers each including a heterostructure. According to one embodiment, there may be a spacer layer between the SOC layer and the PMA layer, and or a spin absorption layer between the SOC layer and the coupling layer.

As used herein, a "SOC material" is a material that has a spin Hall effect coefficient.

As suggested previously, in some embodiments, SOC layer 270 may include a single layer, or multiple layers (i.e., multiple sublayers). For example, SOC layer 270 may comprise a SOC material, or a hetero-structure, which is characterized by being able to provide a Spin Hall effect or an inverse Spin Hall effect (SHE or inverse SHE). In some embodiments, SOC layer 270 may comprise a two-dimensional materials (2D) with spin orbit interaction. In some embodiments, the 2D materials may be selected from a group consisting of: graphene, $MoS_2$, $WSe_2$, $WS_2$, and $MoSe_2$ In some embodiments, the 2D materials include an absorbent selected from a group consisting of: Cu, Ag, Pt, Bi, Fr, and H absorbents.

In some embodiments, SOC layer 270 may include materials including $ROCh_2$, where 'R' is selected from a group consisting of: La, Ce, Pr, Nd, Sr, Sc, Ga, Al, and In, and where "Ch" is a chalcogenide selected from a group consisting of S, Se, and Te.

In some embodiments, SOC layer 270 may include one or more materials that form a hetero-structure with Cu, Ag, Al, and Au.

In some embodiments, SOC layer 270 comprises a material selected from a group consisting of: β-Ta, β-W, W, Pt, Cu doped with Iridium, Cu doped with Bismuth, and Cu doped an element of 3d, 4d, 5d, 4f, or 5f of periodic table groups.

In some embodiments, SOC layer 270 may include any combination of one or more layers/sublayers of the materials described above in the context of a SOC layers.

The layers of FIG. 2A do not have to have a rectangular cross section, and may have any cross section. For example, they can have rounded corners with similar functionality to that for rectangular cross sections.

In some embodiments, such as those described above in FIG. 2A, and to be described below in the context of FIG. 3, the contacts, interconnects and non-magnetic conductors may be formed of non-magnetic metal (e.g., Cu, Ag, etc.).

Advantageously, the provision of a PMA layer in a MESO device provides a perpendicular magnet that is generally are more stable even at a smaller material volume as compared with in-plane layers within output units of MESO devices of the prior art. Because a PMESO device according to some embodiments may have a relatively high surface anisotropy, it may be scaled to much smaller dimensions than MESO devices of the prior art, and still have the same stability as quantified by the energy barrier of the magnet, and, in certain instances, be able to provide a larger $V_{out}$ for a same $V_{in}$ as compared with the prior art.

Advantageously, a location of the PMA unit on a surface of the ME capacitor advantageously not only reduces a footprint of the PMESO device according to some embodiments, but also reduces the in-plane magnetic field M1 that is needed to control the perpendicular magnetic field M2 in the PMA layer. A reduction in the footprint of the PMESO device as compared with a MESO device of the prior art advantageously permits the cascading of a larger number of such devices (an example of a cascaded or tandem connection to be described further below in the context of FIG. 3), thus permitting the fabrication of smaller logic circuits exhibiting the enhanced functionality.

In addition, advantageously, having a full overlap (where a top plan view of the PMA unit would be fully circumscribed within a top plan view of the ME capacitor) of the PMA unit over the ME capacitor would not only advantageously result in a smaller device, but would further provide a PMESO device that may be fabricated by a simpler and more reliable fabrication method than that used in the MESO device of the prior art (e.g. FIG. 1).

For a full overlap configuration of a PMESO device according to some embodiments, a fabrication method may provide that most if not all layers of the PMESO device be grown on top of the bottom conductive layer 206 in sequence and preferably without breaking vacuum conditions. Such a method would result in a multilayered structure with good layer to layer interfaces. A first etch process may then be used to form the PMA unit, and a second etch process may be performed to form the ME capacitor, advantageously resulting in substantially fewer fabrication steps as those required to provide a prior art MESO device, such as that shown in FIG. 1.

Figure 3:
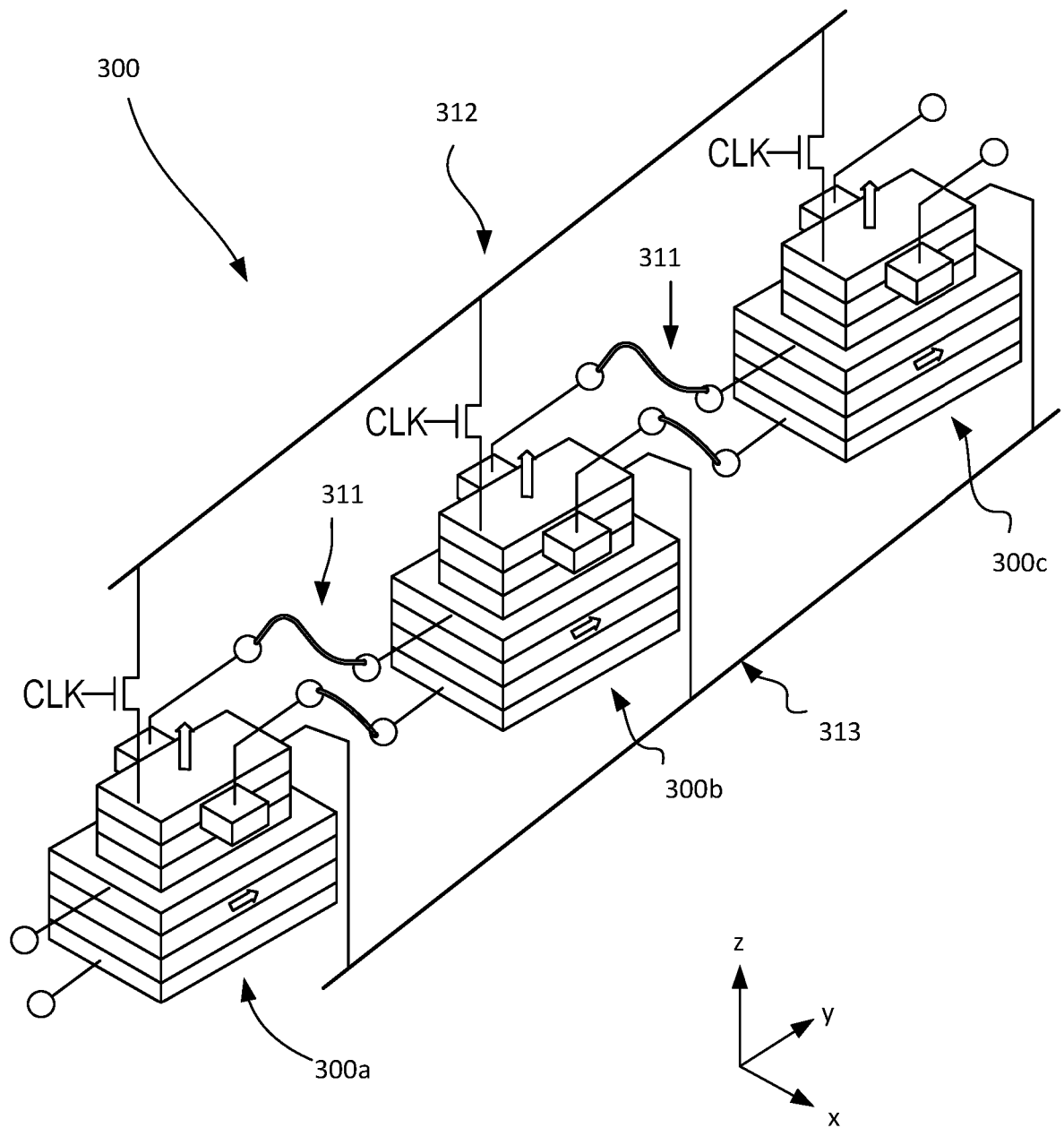
FIG. 3 illustrates a perspective view of a layout of cascaded electric spin orbit logic (PMESO) circuit including two cascaded PMESO inverters in accordance with an embodiment.

FIG. 3 illustrates an integrated circuit structure 300 including a cascaded PMESO logic circuit having a set of PMESO devices 300a, 300b and 300c electrically connected to one another using a cascaded or tandem connection as shown (i.e., where an output one of PMESO device serves as the input of a subsequent PMESO device). PMESO devices 300a, 300b and 300c, similar to the PMESO device 200 of FIG. 2A, are connected to one another in a cascaded fashion as shown to form a logic circuit, or part of a logic circuit. The shown devices are preferably structurally identical to one another, and electrically connected by way of non-magnetic electrical conductors or interconnects. The description provided above regarding FIG. 2A will therefore relate to either of PMESO devices 300a, 300b or 300c of FIG. 3. In addition, in the description of FIG. 3, similar to that of FIGS. 1 and 2A, "vertical" refers to the z dimension, and "horizontal" refers to the x dimension or the y dimension, which directions are shown by way of the coordinate system provided in FIG. 3.

In FIG. 3, PMESO devices 300a, 300b and 300c are similar to PMESO device 200 of FIG. 2. As suggested in FIG. 3, according to some embodiments, successive (potentially thousands or more) PMESO devices may electrically coupled to one another in a cascaded connection using interconnects 311, that is, such that the $V_{out}$ of a given PMESO device serves as the $V_{in}$ of a subsequent PMESO device, $V_{out}$ of the given PMESO device. An output of one PMESO devices thus serves to charge the ME capacitor of the subsequent PMESO device as explained above in the context of FIG. 2, in this manner forming a logic circuit where the state of each PMESO device may be controlled by virtue of controlling $V_{in}$ in a first PMESO device of the cascaded series, and $I_{supply}$, which may be the same for all cascaded PMESO devices, although the various $I_{supply}$'s may be clocked differently as between cascaded PMESO devices. Interconnects 312 and 313 serve to ensure a supply of $I_{supply}$ to the cascaded PMESO devices of FIG. 3 as shown.

Figure 4:
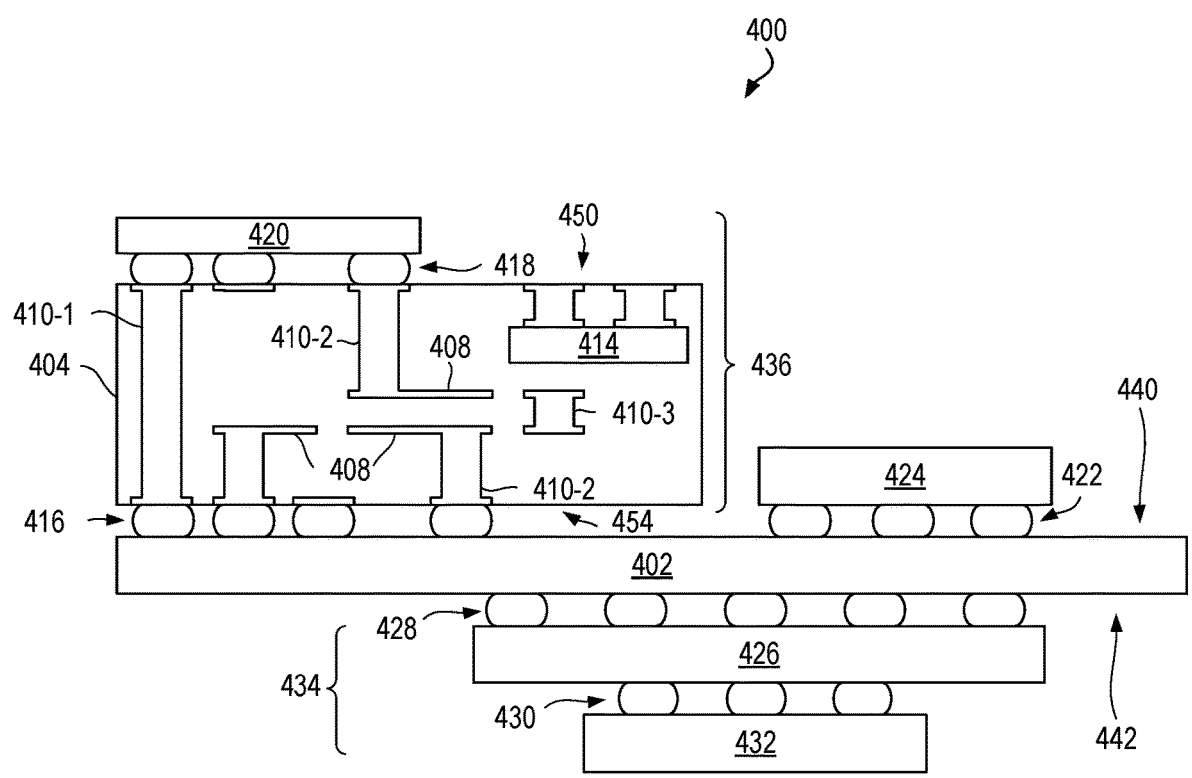
FIG. 4 is a cross-sectional side view of an integrated circuit device assembly that may include a cascaded PMESO circuit, in accordance with any of the embodiments disclosed herein.

FIG. 4 is a cross-sectional side view of an integrated circuit device assembly 400 that may include one or more integrated circuit structures each including any of the (PMESO) devices or circuits described herein. The integrated circuit device assembly 400 includes a number of components disposed on a circuit board 402 (which may be a motherboard, system board, mainboard, etc.). The integrated circuit device assembly 400 includes components disposed on a first face 440 of the circuit board 402 and an opposing second face 442 of the circuit board 402; generally, components may be disposed on one or both faces 440 and 442. Any of the integrated circuit components discussed below with reference to the integrated circuit device assembly 400 may include an integrated circuit structure including a cascaded PMESO circuit as disclosed herein.

In some embodiments, the circuit board 402 may be a printed circuit board (PCB) including multiple metal (or interconnect) layers separated from one another by layers of dielectric material and interconnected by electrically conductive vias. The individual metal layers comprise conductive traces. Any one or more of the metal layers may be formed in a desired circuit pattern to route electrical signals (optionally in conjunction with other metal layers) between the components coupled to the circuit board 402. In other embodiments, the circuit board 402 may be a non-PCB substrate. The integrated circuit device assembly 400 illustrated in FIG. 4 includes a package-on-interposer structure 436 coupled to the first face 440 of the circuit board 402 by coupling components 416. The coupling components 416 may electrically and mechanically couple the package-on-interposer structure 436 to the circuit board 402, and may include solder balls (as shown in FIG. 4), pins (e.g., as part of a pin grid array (PGA), contacts (e.g., as part of a land grid array (LGA)), male and female portions of a socket, an adhesive, an underfill material, and/or any other suitable electrical and/or mechanical coupling structure.

The package-on-interposer structure 436 may include an integrated circuit component 420 coupled to an interposer 404 by coupling components 418. The coupling components 418 may take any suitable form for the application, such as the forms discussed above with reference to the coupling components 416. Although a single integrated circuit component 420 is shown in FIG. 4, multiple integrated circuit components may be coupled to the interposer 404; indeed, additional interposers may be coupled to the interposer 404.

The interposer 404 may provide an intervening substrate used to bridge the circuit board 402 and the integrated circuit component 420.

The integrated circuit component 420 may be a packaged or unpackaged integrated circuit product that includes one or more integrated circuit dies including cascaded PMESO devices such as those shown in FIGS. 3 and 4. A packaged integrated circuit component comprises one or more integrated circuit dies mounted on a package substrate with the integrated circuit dies and package substrate encapsulated in a casing material, such as a metal, plastic, glass, or ceramic. In one example of an unpackaged integrated circuit component 420, a single monolithic integrated circuit die comprises solder bumps attached to contacts on the die. The solder bumps allow the die to be directly attached to the interposer 404. The integrated circuit component 420 can comprise one or more computing system components, such as one or more processor units (e.g., system-on-a-chip (SoC), processor core, graphics processor unit (GPU), accelerator, chipset processor), I/O controller, memory, or network interface controller. In some embodiments, the integrated circuit component 420 can comprise one or more additional active or passive devices such as capacitors, decoupling capacitors, resistors, inductors, fuses, diodes, transformers, sensors, electrostatic discharge (ESD) devices, and memory devices.

In embodiments where the integrated circuit component 420 comprises multiple integrated circuit dies, the dies can be of the same type (a homogeneous multi-die integrated circuit component) or of two or more different types (a heterogeneous multi-die integrated circuit component). A multi-die integrated circuit component can be referred to as a multi-chip package (MCP) or multi-chip module (MCM).

In addition to comprising one or more processor units, the integrated circuit component 420 can comprise additional components, such as embedded DRAM, stacked high bandwidth memory (HBM), shared cache memories, input/output (I/O) controllers, or memory controllers. Any of these additional components can be located on the same integrated circuit die as a processor unit, or on one or more integrated circuit dies separate from the integrated circuit dies comprising the processor units. These separate integrated circuit dies can be referred to as "chiplets". In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof.

Generally, the interposer 404 may spread connections to a wider pitch or reroute a connection to a different connection. For example, the interposer 404 may couple the integrated circuit component 420 to a set of ball grid array (BGA) conductive contacts of the coupling components 416 for coupling to the circuit board 402. In the embodiment illustrated in FIG. 4, the integrated circuit component 420 and the circuit board 402 are attached to opposing sides of the interposer 404; in other embodiments, the integrated circuit component 420 and the circuit board 402 may be attached to a same side of the interposer 404. In some embodiments, three or more components may be interconnected by way of the interposer 404.

In some embodiments, the interposer 404 may be formed as a PCB, including multiple metal layers separated from one another by layers of dielectric material and interconnected by electrically conductive vias. In some embodiments, the interposer 404 may be formed of an epoxy resin, a fiberglass-reinforced epoxy resin, an epoxy resin with inorganic fillers, a ceramic material, or a polymer material such as polyimide. In some embodiments, the interposer 404 may be formed of alternate rigid or flexible materials that may include the same materials described above for use in a semiconductor substrate, such as silicon, germanium, and other group III-V and group IV materials. The interposer 404 may include metal interconnects 408 and vias 410, including but not limited to through hole vias 410-1 (that extend from a first face 450 of the interposer 404 to a second face 454 of the interposer 404), blind vias 410-2 (that extend from the first or second faces 450 or 454 of the interposer 404 to an internal metal layer), and buried vias 410-3 (that connect internal metal layers).

In some embodiments, the interposer 404 can comprise a silicon interposer. Through silicon vias (TSV) extending through the silicon interposer can connect connections on a first face of a silicon interposer to an opposing second face of the silicon interposer. In some embodiments, an interposer 404 comprising a silicon interposer can further comprise one or more routing layers to route connections on a first face of the interposer 404 to an opposing second face of the interposer 404.

The interposer 404 may further include embedded devices 414, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency devices, power amplifiers, power management devices, antennas, arrays, sensors, and microelectromechanical systems (MEMS) devices may also be formed on the interposer 404. The package-on-interposer structure 436 may take the form of any of the package-on-interposer structures known in the art. In embodiments where the interposer is a non-printed circuit board The integrated circuit device assembly 400 may include an integrated circuit component 424 coupled to the first face 440 of the circuit board 402 by coupling components 422. The coupling components 422 may take the form of any of the embodiments discussed above with reference to the coupling components 416, and the integrated circuit component 424 may take the form of any of the embodiments discussed above with reference to the integrated circuit component 420.

The integrated circuit device assembly 400 illustrated in FIG. 4 includes a package-on-package structure 434 coupled to the second face 442 of the circuit board 402 by coupling components 428. The package-on-package structure 434 may include an integrated circuit component 426 and an integrated circuit component 432 coupled together by coupling components 430 such that the integrated circuit component 426 is disposed between the circuit board 402 and the integrated circuit component 432. The coupling components 428 and 430 may take the form of any of the embodiments of the coupling components 416 discussed above, and the integrated circuit components 426 and 432 may take the form of any of the embodiments of the integrated circuit component 420 discussed above. The package-on-package structure 434 may be configured in accordance with any of the package-on-package structures known in the art.

Figure 5:
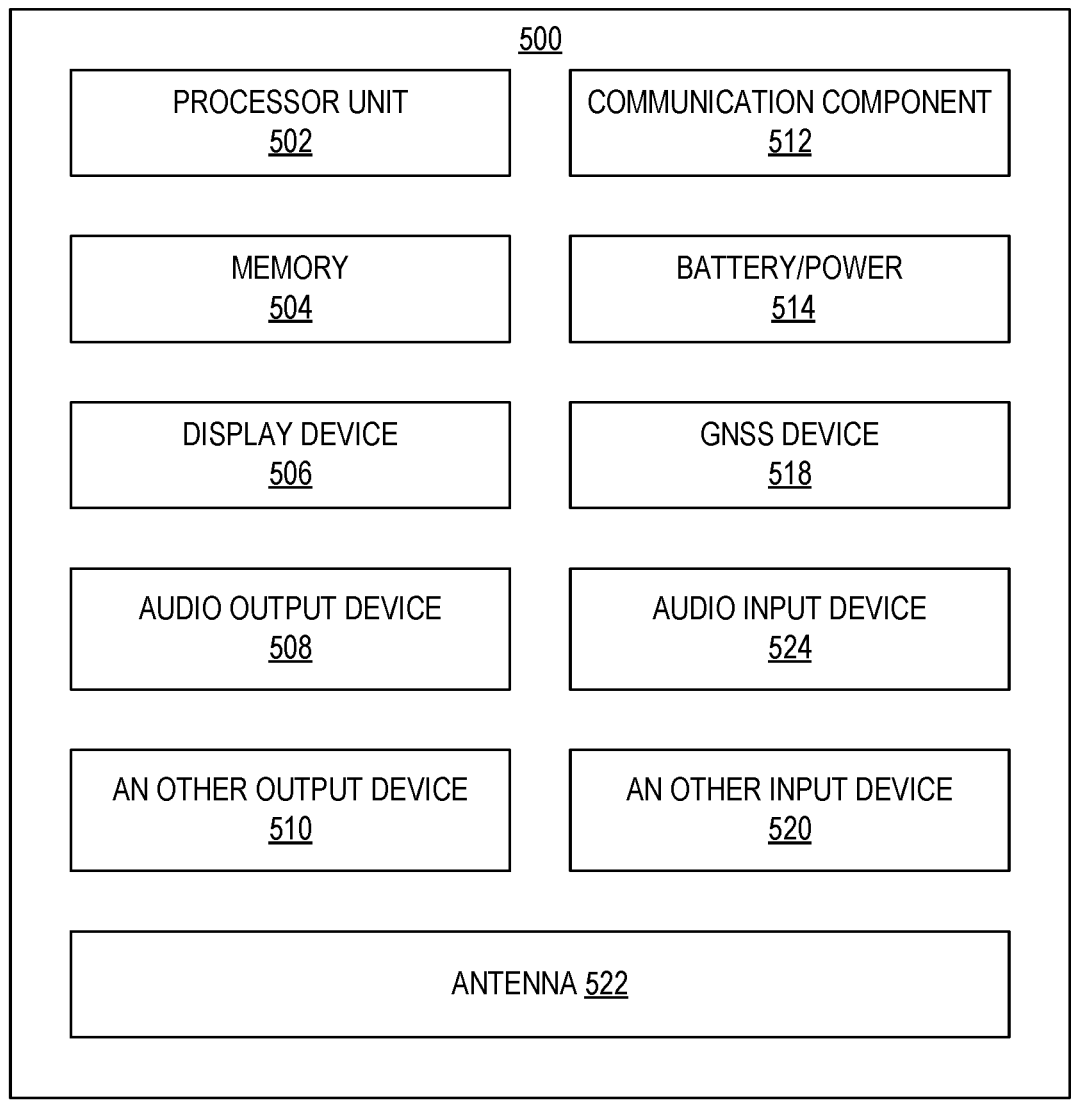
FIG. 5 is a block diagram of an example electrical device that may include a cascaded PMESO circuit, in accordance with any of the embodiments disclosed herein.

FIG. 5 is a block diagram of an example electrical device 500 that may include one or more of the PMESO devices disclosed herein. For example, any suitable ones of the components of the electrical device 500 may include one or more of the integrated circuit device assemblies 400, integrated circuit components 420, and/or PMESO devices 300 disclosed herein. A number of components are illustrated in FIG. 5 as included in the electrical device 500, but any one or more of these components may be omitted or duplicated, as suitable for the application. In some embodiments, some or all of the components included in the electrical device 500 may be attached to one or more motherboards mainboards, or system boards. In some embodiments, one or more of these components are fabricated onto a single system-on-a-chip (SoC) die.

Additionally, in various embodiments, the electrical device 500 may not include one or more of the components illustrated in FIG. 5, but the electrical device 500 may include interface circuitry for coupling to the one or more components. For example, the electrical device 500 may not include a display device 506, but may include display device interface circuitry (e.g., a connector and driver circuitry) to which a display device 506 may be coupled. In another set of examples, the electrical device 500 may not include an audio input device 524 or an audio output device 508, but may include audio input or output device interface circuitry (e.g., connectors and supporting circuitry) to which an audio input device 524 or audio output device 508 may be coupled.

The electrical device 500 may include one or more processor units 502 (e.g., one or more processor units). As used herein, the terms "processor unit", "processing unit" or "processor" may refer to any device or portion of a device that processes electronic data from registers and/or memory to transform that electronic data into other electronic data that may be stored in registers and/or memory. The processor unit 502 may include one or more digital signal processors (DSPs), application-specific integrated circuits (ASICs), central processing units (CPUs), graphics processing units (GPUs), general-purpose GPUs (GPGPUs), accelerated processing units (APUs), field-programmable gate arrays (FPGAs), neural network processing units (NPUs), data processor units (DPUs), accelerators (e.g., graphics accelerator, compression accelerator, artificial intelligence accelerator), controller cryptoprocessors (specialized processors that execute cryptographic algorithms within hardware), server processors, controllers, or any other suitable type of processor units. As such, the processor unit can be referred to as an XPU (or xPU).

The electrical device 500 may include a memory 504, which may itself include one or more memory devices such as volatile memory (e.g., dynamic random access memory (DRAM), static random-access memory (SRAM)), non-volatile memory (e.g., read-only memory (ROM), flash memory, chalcogenide-based phase-change non-voltage memories), solid state memory, and/or a hard drive. In some embodiments, the memory 504 may include memory that is located on the same integrated circuit die as the processor unit 502. This memory may be used as cache memory (e.g., Level 1 (L1), Level 2 (L2), Level 3 (L3), Level 4 (L4), Last Level Cache (LLC)) and may include embedded dynamic random access memory (eDRAM) or spin transfer torque magnetic random access memory (STT-MRAM).

In some embodiments, the electrical device 500 can comprise one or more processor units 502 that are heterogeneous or asymmetric to another processor unit 502 in the electrical device 500. There can be a variety of differences between the processing units 502 in a system in terms of a spectrum of metrics of merit including architectural, microarchitectural, thermal, power consumption characteristics, and the like. These differences can effectively manifest themselves as asymmetry and heterogeneity among the processor units 502 in the electrical device 500.

In some embodiments, the electrical device 500 may include a communication component 512 (e.g., one or more communication components). For example, the communication component 512 can manage wireless communications for the transfer of data to and from the electrical device 500. The term "wireless" and its derivatives may be used to describe circuits, devices, systems, methods, techniques, communications channels, etc., that may communicate data through the use of modulated electromagnetic radiation through a nonsolid medium. The term "wireless" does not imply that the associated devices do not contain any wires, although in some embodiments they might not.

The communication component 512 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra-mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication component 512 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication component 512 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication component 512 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication component 512 may operate in accordance with other wireless protocols in other embodiments. The electrical device 500 may include one or more antennas, such as antenna 522 to facilitate wireless communications and/or to receive other wireless communications (such as AM or FM radio transmissions).

In some embodiments, the communication component 512 may manage wired communications, such as electrical, optical, or any other suitable communication protocols (e.g., IEEE 802.3 Ethernet standards). As noted above, the communication component 512 may include multiple communication components. For instance, a first communication component 512 may be dedicated to shorter-range wireless communications such as Wi-Fi or Bluetooth, and a second communication component 512 may be dedicated to longer-range wireless communications such as global positioning system (GPS), EDGE, GPRS, CDMA, WiMAX, LTE, EV-DO, or others. In some embodiments, a first communication component 512 may be dedicated to wireless communications, and a second communication component 512 may be dedicated to wired communications.

The electrical device 500 may include battery/power circuitry 514. The battery/power circuitry 514 may include one or more energy storage devices (e.g., batteries or capacitors) and/or circuitry for coupling components of the electrical device 500 to an energy source separate from the electrical device 500 (e.g., AC line power).

The electrical device 500 may include a display device 506 (or corresponding interface circuitry, as discussed above). The display device 506 may include one or more embedded or wired or wirelessly connected external visual indicators, such as a heads-up display, a computer monitor, a projector, a touchscreen display, a liquid crystal display (LCD), a light-emitting diode display, or a flat panel display.

The electrical device 500 may include an audio output device 508 (or corresponding interface circuitry, as discussed above). The audio output device 508 may include any embedded or wired or wirelessly connected external device that generates an audible indicator, such speakers, headsets, or earbuds.

The electrical device 500 may include an audio input device 524 (or corresponding interface circuitry, as discussed above). The audio input device 524 may include any embedded or wired or wirelessly connected device that generates a signal representative of a sound, such as microphones, microphone arrays, or digital instruments (e.g., instruments having a musical instrument digital interface (MIDI) output). The electrical device 500 may include a Global Navigation Satellite System (GNSS) device 518 (or corresponding interface circuitry, as discussed above), such as a Global Positioning System (GPS) device. The GNSS device 518 may be in communication with a satellite-based system and may determine a geolocation of the electrical device 500 based on information received from one or more GNSS satellites, as known in the art.

The electrical device 500 may include another output device 510 (or corresponding interface circuitry, as discussed above). Examples of the other output device 510 may include an audio codec, a video codec, a printer, a wired or wireless transmitter for providing information to other devices, or an additional storage device.

The electrical device 500 may include another input device 520 (or corresponding interface circuitry, as discussed above). Examples of the other input device 520 may include an accelerometer, a gyroscope, a compass, an image capture device (e.g., monoscopic or stereoscopic camera), a trackball, a trackpad, a touchpad, a keyboard, a cursor control device such as a mouse, a stylus, a touchscreen, proximity sensor, microphone, a bar code reader, a Quick Response (QR) code reader, electrocardiogram (ECG) sensor, PPG (photoplethysmogram) sensor, galvanic skin response sensor, any other sensor, or a radio frequency identification (RFID) reader.

The electrical device 500 may have any desired form factor, such as a hand-held or mobile electrical device (e.g., a cell phone, a smart phone, a mobile internet device, a music player, a tablet computer, a laptop computer, a 2-in-1 convertible computer, a portable all-in-one computer, a netbook computer, an ultrabook computer, a personal digital assistant (PDA), an ultra-mobile personal computer, a portable gaming console, etc.), a desktop electrical device, a server, a rack-level computing solution (e.g., blade, tray or sled computing systems), a workstation or other networked computing component, a printer, a scanner, a monitor, a set-top box, an entertainment control unit, a stationary gaming console, smart television, a vehicle control unit, a digital camera, a digital video recorder, a wearable electrical device or an embedded computing system (e.g., computing systems that are part of a vehicle, smart home appliance, consumer electronics product or equipment, manufacturing equipment). In some embodiments, the electrical device 500 may be any other electronic device that processes data. In some embodiments, the electrical device 500 may comprise multiple discrete physical components. Given the range of devices that the electrical device 500 can be manifested as in various embodiments, in some embodiments, the electrical device 500 can be referred to as a computing device or a computing system.

Figure 6:
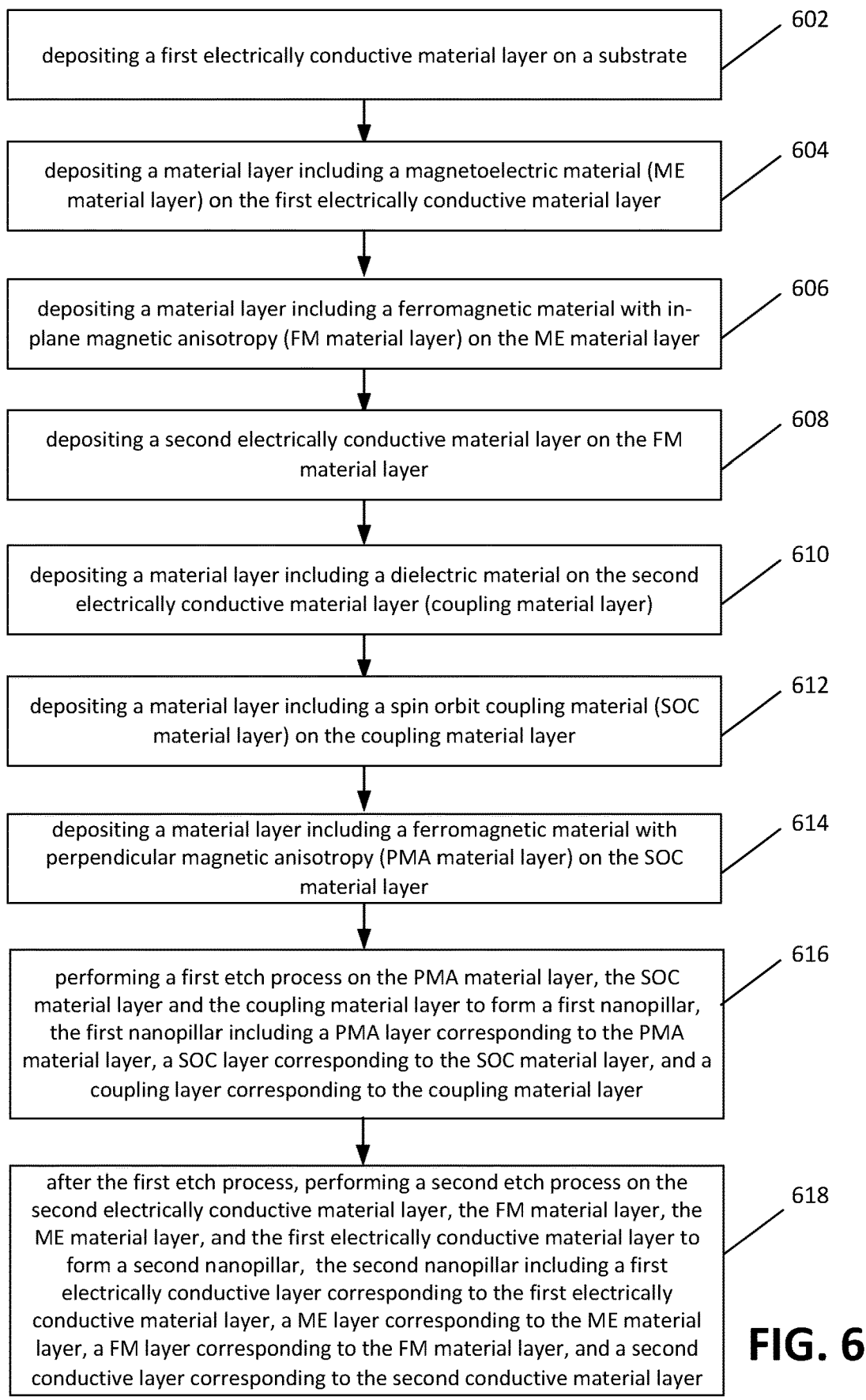
FIG. 6 is a flow chart of a process according to some embodiments.

FIG. 6 is a flow chart of a process 600 according to some embodiments. At operation 602, the process includes depositing a first electrically conductive material layer on a substrate. At operation 604, the process includes depositing a material layer including a magnetoelectric material (ME material layer) on the first electrically conductive material layer. At operation 606, the process includes depositing a material layer including a ferromagnetic material with in-plane magnetic anisotropy (FM material layer) on the ME material layer. At operation 608, the process includes depositing a second electrically conductive material layer on the FM material layer. At operation 610, the process includes depositing a material layer including a dielectric material on the second electrically conductive material layer (coupling material layer). At operation 612, the process includes depositing a material layer including a spin orbit coupling material (SOC material layer) on the coupling material layer. At operation 614, the process includes depositing a material layer including a ferromagnetic material with perpendicular magnetic anisotropy (PMA material layer) on the SOC material layer. At operation 616, the process includes performing a first etch process on the PMA material layer, the SOC material layer and the coupling material layer to form a first nanopillar, the first nanopillar including a PMA layer corresponding to the PMA material layer, a SOC layer corresponding to the SOC material layer, and a coupling layer corresponding to the coupling material layer. At operation 618, the process includes, after the first etch process, performing a second etch process on the second electrically conductive material layer, the FM material layer, the ME material layer, and the first electrically conductive material layer to form a second nanopillar, the second nanopillar including a first electrically conductive layer corresponding to the first electrically conductive material layer, a ME layer corresponding to the ME material layer, a FM layer corresponding to the FM material layer, and a second conductive layer corresponding to the second conductive material layer.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of embodiments has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

As used in the description of the example embodiments and the appended examples, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

In embodiments, the phrase "A is located on B" means that at least a part of A is in direct physical contact or indirect physical contact (having one or more other features between A and B) with at least a part of B.

In the instant description, "A is adjacent to B" means that at least part of A is in direct physical contact with at least a part of B.

In the instant description, "B is between A and C" means that at least part of B is in or along a space separating A and C and that the at least part of B is in direct or indirect physical contact with A and with C.

In the instant description, "A is attached to B" means that at least part of A is mechanically attached to at least part of B, either directly or indirectly (having one or more other features between A and B).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," "according to some embodiments," "in accordance with embodiments," or "in embodiments," which may each refer to one or more of the same or different embodiments. Furthermore, the terms "comprising," "including," "having," and the like, as used with respect to embodiments of the present disclosure, are synonymous.

"Coupled" as used herein means that two or more elements are in direct physical contact, or that that two or more elements indirectly physically contact each other, but yet still cooperate or interact with each other (i.e. one or more other elements are coupled or connected between the elements that are said to be coupled with each other). The term "directly coupled" means that two or more elements are in direct contact.

As used herein, the term "module" refers to being part of, or including an ASIC, an electronic circuit, a system on a chip, a processor (shared, dedicated, or group), a solid state device, a memory (shared, dedicated, or group) that execute one or more software or firmware programs, a combinational logic circuit, and/or other suitable components that provide the described functionality.

As used herein, "electrically conductive" in some examples may refer to a property of a material having an electrical conductivity greater than or equal to $10^7$ Siemens per meter (S/m) at 20 degrees Celsius. Examples of such materials include Cu, Ag, Al, Au, W, Zn and Ni.

As used herein, an "integrated circuit structure" may include one or more microelectronic dies.

In the corresponding drawings of the embodiments, signals, currents, electrical biases, or magnetic or electrical polarities may be represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, polarity, current, voltage, etc., as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the elements that are connected, without any intermediary devices. The term "coupled" means a direct or indirect connection, such as a direct electrical, mechanical, or magnetic connection between the elements that are connected or an indirect connection, through one or more passive or active intermediary devices. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about," generally refer to being within +/−10% of a target value (unless specifically specified). Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), SquareWire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

EXAMPLES

Some non-limiting example embodiments are set forth below.

Example 1 includes a logic device including: a first electrically conductive layer; a layer including a magneto-electric material (ME layer) on the first electrically conductive layer; a layer including a ferromagnetic material with in-plane magnetic anisotropy (FM layer) on the ME layer; a middle layer on the FM layer, the middle layer including one of a second electrically conductive layer or an in-plane ferromagnetic layer; a layer including a dielectric material on the middle layer (coupling layer); a layer including a spin orbit coupling material (SOC layer) on the coupling layer; and a layer including a ferromagnetic material with perpendicular magnetic anisotropy (PMA layer) on the SOC layer.

Example 2 includes the subject matter of Example 1, further including: a first electrically conductive structure at one side of the PMA layer and electrically coupled thereto; and a second electrically conductive structure at an opposite side of the PMA layer electrically coupled thereto, wherein the first electrically conductive structure and the second electrically conductive structure face each other in a direction transverse to a direction of the perpendicular magnetic anisotropy of the PMA layer.

Example 3 includes the subject matter of Example 1, wherein the PMA layer includes a sublayer including MgO.

Example 4 includes the subject matter of Example 1, wherein the PMA layer at least partially vertically overlaps the FM layer.

Example 5 includes the subject matter of Example 4, wherein the PMA layer fully vertically overlaps the FM layer.

Example 6 includes the subject matter of Example 1, wherein the middle layer extends beyond at least one lateral dimension of the coupling layer.

Example 7 includes the subject matter of Example 1, wherein the coupling layer has a thickness in a same scale as a thickness of at least one of the first electrically conductive layer, the ME layer, the FM layer, the middle layer, the SOC layer or the PMA layer.

Example 8 includes the subject matter of Example 1, wherein individual ones of the first electrically conductive layer, the ME layer, the FM layer, the middle layer, the coupling layer, the SOC layer and the PMA layer have a thickness in a range from about 1 nm to about 5 nm.

Example 9 includes the subject matter of Example 1, wherein the ferromagnetic material with perpendicular magnetic anisotropy includes at least one of: a heterostructure including MgO and one or more of: cobalt, or iron; a super lattice including cobalt and platinum; or a two-dimensional ferromagnetic material.

Example 10 includes the subject matter of Example 9, wherein the two-dimensional ferromagnetic material includes at least one of $FePS_3$, $Cr_2Ge_2Te_6$, $CrI_3$, $NiPS_3$, $MnPS_3$, or $Fe_3GeTe_2$.

Example 11 includes the subject matter of Example 1, wherein the ferromagnetic material with perpendicular magnetic anisotropy includes MgO at a side thereof further away from the SOC layer, and at least one of cobalt, boron or iron at a side thereof closer to the SOC layer.

Example 12 includes the subject matter of Example 11, wherein the PMA layer has a thickness of about 1.5 nm or less.

Example 13 includes the subject matter of Example 1, wherein the ferromagnetic material with perpendicular magnetic anisotropy includes iron, platinum and cobalt.

Example 14 includes the subject matter of Example 1, wherein the SOC layer includes at least one of tantalum, platinum, or tungsten.

Example 15 includes the subject matter of Example 1, wherein the SOC layer includes at least one bismuth selenide, bismuth telluride, bismuth selenide telluride, or antimony telluride.

Example 16 includes the subject matter of Example 1, wherein the SOC layer includes a two-dimensional material including tungsten diselenide, tungsten disulfide, or proximitized graphene.

Example 17 includes the subject matter of Example 1, wherein the SOC layer includes a composite material including a two-dimensional material and a heavy metal.

Example 18 includes an integrated circuit structure comprising a plurality of logic devices electrically coupled to one another, wherein individual ones of the plurality logic devices of the plurality of logic devices include: a first electrically conductive layer; a layer including a magneto-electric material (ME layer) on the first electrically conductive layer; a layer including a ferromagnetic material with in-plane magnetic anisotropy (FM layer) on the ME layer; a middle layer on the FM layer, the middle layer including one of a second electrically conductive layer or an in-plane ferromagnetic layer; a layer including a dielectric material on the middle layer (coupling layer); a layer including a spin orbit coupling material (SOC layer) on the coupling layer; a layer including a ferromagnetic material with perpendicular magnetic anisotropy (PMA layer) on the SOC layer; a first electrically conductive structure at one side of the PMA layer and electrically coupled thereto; and a second electrically conductive structure at an opposite side of the PMA layer electrically coupled thereto, wherein the first electrically conductive structure and the second electrically conductive structure face each other in a direction transverse to a direction of the perpendicular magnetic anisotropy of the PMA layer, the first electrically conductive structure and the second electrically conductive structure further together corresponding to an output of said individual ones of the plurality of logic devices.

Example 19 includes the subject matter of Example 18, further including a first plurality of interconnects providing a cascaded electrical connection between successive ones of the plurality of the logic devices.

Example 20 includes the subject matter of Example 18, wherein the PMA layer includes a sublayer including MgO.

Example 21 includes the subject matter of Example 18, wherein the PMA layer at least partially vertically overlaps the FM layer.

Example 22 includes the subject matter of Example 21, wherein the PMA layer fully vertically overlaps the FM layer.

Example 23 includes the subject matter of Example 18, wherein the middle layer extends beyond at least one lateral dimension of the coupling layer.

Example 24 includes the subject matter of Example 18, wherein the coupling layer has a thickness in a same scale as a thickness of at least one of the first electrically conductive layer, the ME layer, the FM layer, the middle layer, the SOC layer or the PMA layer.

Example 25 includes the subject matter of Example 18, wherein individual ones of the first electrically conductive layer, the ME layer, the FM layer, the middle layer, the coupling layer, the SOC layer and the PMA layer have a thickness in a range from about 1 nm to about 5 nm.

Example 26 includes the subject matter of Example 18, wherein the ferromagnetic material with perpendicular magnetic anisotropy includes at least one of: a heterostructure including MgO and one or more of: cobalt, or iron; a super lattice including cobalt and platinum; or a two-dimensional ferromagnetic material.

Example 27 includes the subject matter of Example 26, wherein the two-dimensional ferromagnetic material includes at least one of $FePS_3$, $Cr_2Ge_2Te_6$, $CrI_3$, $NiPS_3$, $MnPS_3$, or $Fe_3GeTe_2$.

Example 28 includes the subject matter of Example 18, wherein the ferromagnetic material with perpendicular magnetic anisotropy includes MgO at a side thereof further away from the SOC layer, and at least one of cobalt, boron or iron at a side thereof closer to the SOC layer.

Example 29 includes the subject matter of Example 28, wherein the PMA layer has a thickness of about 1.5 nm or less.

Example 30 includes the subject matter of Example 18, wherein the ferromagnetic material with perpendicular magnetic anisotropy includes iron, platinum and cobalt.

Example 31 includes the subject matter of Example 18, wherein the SOC layer includes at least one of tantalum, platinum, or tungsten.

Example 32 includes the subject matter of Example 18, wherein the SOC layer includes at least one bismuth selenide, bismuth telluride, bismuth selenide telluride, or antimony telluride.

Example 33 includes the subject matter of Example 18, wherein the SOC layer includes a two-dimensional material including tungsten diselenide, tungsten disulfide, or proximitized graphene.

Example 34 includes the subject matter of Example 18, wherein the SOC layer includes a composite material including a two-dimensional material and a heavy metal.

Example 35 includes an integrated circuit device assembly including: a printed circuit board; and a plurality of integrated circuit components attached to the printed circuit board, individual ones of the integrated circuit components including one or more integrated circuit dies, individual ones of the dies including: a plurality of logic devices, wherein individual ones of the plurality of logic devices include: a first electrically conductive layer; a layer including a magnetoelectric material (ME layer) on the first electrically conductive layer; a layer including a ferromagnetic material with in-plane magnetic anisotropy (FM layer) on the ME layer; a middle layer on the FM layer, the middle layer including one of a second electrically conductive layer or an in-plane ferromagnetic layer; a layer including a dielectric material on the middle layer (coupling layer); a layer including a spin orbit coupling material (SOC layer) on the coupling layer; a layer including a ferromagnetic material with perpendicular magnetic anisotropy (PMA layer) on the SOC layer; a first electrically conductive structure at one side of the PMA layer and electrically coupled thereto; and a second electrically conductive structure at an opposite side of the PMA layer electrically coupled thereto, wherein the first electrically conductive structure and the second electrically conductive structure face each other in a direction transverse to a direction of the perpendicular magnetic anisotropy of the PMA layer, the first electrically conductive structure and the second electrically conductive structure further together corresponding to an output of said individual ones of the plurality of logic devices.

Example 36 includes the subject matter of Example 35, further including a first plurality of interconnects providing a cascaded electrical connection between successive ones of the plurality of the logic devices.

Example 37 includes the subject matter of Example 35, wherein the PMA layer includes a sublayer including MgO.

Example 38 includes the subject matter of Example 35, wherein the PMA layer at least partially vertically overlaps the FM layer.

Example 39 includes the subject matter of Example 38, wherein the PMA layer fully vertically overlaps the FM layer.

Example 40 includes the subject matter of Example 35, wherein the middle layer extends beyond at least one lateral dimension of the coupling layer.

Example 41 includes the subject matter of Example 35, wherein the coupling layer has a thickness in a same scale as a thickness of at least one of the first electrically conductive layer, the ME layer, the FM layer, the middle layer, the SOC layer or the PMA layer.

Example 42 includes the subject matter of Example 35, wherein individual ones of the first electrically conductive layer, the ME layer, the FM layer, the middle layer, the coupling layer, the SOC layer and the PMA layer have a thickness in a range from about 1 nm to about 5 nm.

Example 43 includes the subject matter of Example 35, wherein the ferromagnetic material with perpendicular magnetic anisotropy includes at least one of: a heterostructure including MgO and one or more of: cobalt, or iron; a super lattice including cobalt and platinum; or a two-dimensional ferromagnetic material.

Example 44 includes the subject matter of Example 43, wherein the two-dimensional ferromagnetic material includes at least one of $FePS_3$, $Cr_2Ge_2Te_6$, $CrI_3$, $NiPS_3$, $MnPS_3$, or $Fe_3GeTe_2$.

Example 45 includes the subject matter of Example 35, wherein the ferromagnetic material with perpendicular magnetic anisotropy includes MgO at a side thereof further away from the SOC layer, and at least one of cobalt, boron or iron at a side thereof closer to the SOC layer.

Example 46 includes the subject matter of Example 45, wherein the PMA layer has a thickness of about 1.5 nm or less.

Example 47 includes the subject matter of Example 35, wherein the ferromagnetic material with perpendicular magnetic anisotropy includes iron, platinum and cobalt.

Example 48 includes the subject matter of Example 35, wherein the SOC layer includes at least one of tantalum, platinum, or tungsten.

Example 49 includes the subject matter of Example 35, wherein the SOC layer includes at least one bismuth selenide, bismuth telluride, bismuth selenide telluride, or antimony telluride.

Example 50 includes the subject matter of Example 35, wherein the SOC layer includes a two-dimensional material including tungsten diselenide, tungsten disulfide, or proximitized graphene.

Example 51 includes the subject matter of Example 35, wherein the SOC layer includes a composite material including a two-dimensional material and a heavy metal.

Example 52 includes a method of fabricating a logic circuit including: depositing a first electrically conductive material layer on a substrate; depositing a material layer including a magnetoelectric material (ME material layer) on the first electrically conductive material layer; depositing a material layer including a ferromagnetic material with in-plane magnetic anisotropy (FM material layer) on the ME material layer; depositing a second electrically conductive material layer on the FM material layer; depositing a material layer including a dielectric material on the second electrically conductive material layer (coupling material layer); depositing a material layer including a spin orbit coupling material (SOC material layer) on the coupling material layer; and depositing a material layer including a ferromagnetic material with perpendicular magnetic anisotropy (PMA material layer) on the SOC material layer; performing a first etch process on the PMA material layer, the SOC material layer and the coupling material layer to form a first nanopillar, the first nanopillar including a PMA layer corresponding to the PMA material layer, a SOC layer corresponding to the SOC material layer, and a coupling layer corresponding to the coupling material layer; and after the first etch process, performing a second etch process on the second electrically conductive material layer, the FM material layer, the ME material layer, and the first electrically conductive material layer to form a second nanopillar, the second nanopillar including a first electrically conductive layer corresponding to the first electrically conductive material layer, a ME layer corresponding to the ME material layer, a FM layer corresponding to the FM material layer, and a second conductive layer corresponding to the second conductive material layer Example 53 includes the subject matter of Example 52, further including: providing a first electrically conductive structure at one side of the PMA layer and electrically coupled thereto; and providing a second electrically conductive structure at an opposite side of the PMA layer electrically coupled thereto, wherein the first electrically conductive structure and the second electrically conductive structure face each other in a direction transverse to a direction of the perpendicular magnetic anisotropy of the PMA layer.

Example 54 includes the subject matter of Example 52, wherein the PMA layer includes a sublayer including MgO.

Example 55 includes the subject matter of Example 52, wherein the PMA layer at least partially vertically overlaps the FM layer.

Example 56 includes the subject matter of Example 55, wherein the PMA layer fully vertically overlaps the FM layer.

Example 57 includes the subject matter of Example 52, wherein the middle layer extends beyond at least one lateral dimension of the coupling layer.

Example 58 includes the subject matter of Example 52, wherein the coupling layer has a thickness in a same scale as a thickness of at least one of the first electrically conductive layer, the ME layer, the FM layer, the middle layer, the SOC layer or the PMA layer.

Example 59 includes the subject matter of Example 52, wherein individual ones of the first electrically conductive layer, the ME layer, the FM layer, the middle layer, the coupling layer, the SOC layer and the PMA layer have a thickness in a range from about 1 nm to about 5 nm.

Example 60 includes the subject matter of Example 52, wherein the ferromagnetic material with perpendicular magnetic anisotropy includes at least one of: a heterostructure including MgO and one or more of: cobalt, or iron; a super lattice including cobalt and platinum; or a two-dimensional ferromagnetic material.

Example 61 includes the subject matter of Example 60, wherein the two-dimensional ferromagnetic material includes at least one of $FePS_3$, $Cr_2Ge_2Te_6$, $CrI_3$, $NiPS_3$, $MnPS_3$, or $Fe_3GeTe_2$.

Example 62 includes the subject matter of Example 52, wherein the ferromagnetic material with perpendicular magnetic anisotropy includes MgO at a side thereof further away from the SOC layer, and at least one of cobalt, boron or iron at a side thereof closer to the SOC layer.

Example 63 includes the subject matter of Example 62, wherein the PMA layer has a thickness of about 1.5 nm or less.

Example 64 includes the subject matter of Example 52, wherein the ferromagnetic material with perpendicular magnetic anisotropy includes iron, platinum and cobalt.

Example 65 includes the subject matter of Example 52, wherein the SOC layer includes at least one of tantalum, platinum, or tungsten.

Example 66 includes the subject matter of Example 52, wherein the SOC layer includes at least one bismuth selenide, bismuth telluride, bismuth selenide telluride, or antimony telluride.

Example 67 includes the subject matter of Example 52, wherein the SOC layer includes a two-dimensional material including tungsten diselenide, tungsten disulfide, or proximitized graphene.

Example 68 includes the subject matter of Example 52, wherein the SOC layer includes a composite material including a two-dimensional material and a heavy metal.

What is claimed is:

1. A logic device including:
   a first electrically conductive layer;
   a layer including a magnetoelectric material (ME layer) on the first electrically conductive layer;
   a layer including a ferromagnetic material with in-plane magnetic anisotropy (FM layer) on the ME layer;
   a middle layer on the FM layer, the middle layer including one of a second electrically conductive layer or an in-plane ferromagnetic layer;
a layer including a dielectric material on the middle layer (coupling layer);
a layer including a spin orbit coupling material (SOC layer) on the coupling layer; and
a layer including a ferromagnetic material with perpendicular magnetic anisotropy (PMA layer) on the SOC layer.

2. The logic device of claim 1, further including:
   a first electrically conductive structure at one side of the PMA layer and electrically coupled thereto; and
   a second electrically conductive structure at an opposite side of the PMA layer electrically coupled thereto, wherein the first electrically conductive structure and the second electrically conductive structure face each other in a direction transverse to a direction of the perpendicular magnetic anisotropy of the PMA layer.

3. The logic device of claim 1, wherein the PMA layer includes a sublayer including MgO.

4. The logic device of claim 1, wherein the PMA layer at least partially vertically overlaps the FM layer.

5. The logic device of claim 1, wherein individual ones of the first electrically conductive layer, the ME layer, the FM layer, the middle layer, the coupling layer, the SOC layer and the PMA layer have a thickness in a range from about 1 nm to about 5 nm.

6. The logic device of claim 1, wherein the ferromagnetic material with perpendicular magnetic anisotropy includes at least one of:
    a heterostructure including MgO and one or more of: cobalt, or iron;
    a super lattice including cobalt and platinum; or
    a two-dimensional ferromagnetic material.

7. The logic device of claim 6, wherein the two-dimensional ferromagnetic material includes at least one of $FePS_3$, $Cr_2Ge_2Te_6$, $CrI_3$, $NiPS_3$, $MnPS_3$, or $Fe_3GeTe_2$.

8. The logic device of claim 1, wherein the ferromagnetic material with perpendicular magnetic anisotropy includes MgO at a side thereof further away from the SOC layer, and at least one of cobalt, boron or iron at a side thereof closer to the SOC layer.

9. The logic device of claim 8, wherein the PMA layer has a thickness of about 1.5 nm or less.

10. The logic device of claim 1, wherein the ferromagnetic material with perpendicular magnetic anisotropy includes iron, platinum and cobalt.

11. The logic device of claim 1, wherein the SOC layer includes at least one of:
    tantalum, platinum, or tungsten;
    bismuth selenide, bismuth telluride, bismuth selenide telluride, or antimony telluride;
    a two-dimensional material including tungsten diselenide, tungsten disulfide, or proximitized graphene; or
    a composite material including a two-dimensional material and a heavy metal.

12. An integrated circuit structure comprising a plurality of logic devices electrically coupled to one another, wherein individual ones of the plurality logic devices of the plurality of logic devices include:
    a first electrically conductive layer;
    a layer including a magnetoelectric material (ME layer) on the first electrically conductive layer;
    a layer including a ferromagnetic material with in-plane magnetic anisotropy (FM layer) on the ME layer;
    a middle layer on the FM layer, the middle layer including one of a second electrically conductive layer or an in-plane ferromagnetic layer;
    a layer including a dielectric material on the middle layer (coupling layer);
    a layer including a spin orbit coupling material (SOC layer) on the coupling layer;
    a layer including a ferromagnetic material with perpendicular magnetic anisotropy (PMA layer) on the SOC layer;
    a first electrically conductive structure at one side of the PMA layer and electrically coupled thereto; and
    a second electrically conductive structure at an opposite side of the PMA layer electrically coupled thereto, wherein the first electrically conductive structure and the second electrically conductive structure face each other in a direction transverse to a direction of the perpendicular magnetic anisotropy of the PMA layer, the first electrically conductive structure and the second electrically conductive structure further together corresponding to an output of said individual ones of the plurality of logic devices.

13. The integrated circuit structure of claim 12, further including a first plurality of interconnects providing a cascaded electrical connection between successive ones of the plurality of the logic devices.

14. The integrated circuit structure of claim 12, wherein the PMA layer includes a sublayer including MgO.

15. The integrated circuit structure of claim 12, wherein the PMA layer at least partially vertically overlaps the FM layer.

16. The integrated circuit structure of claim 12, wherein the coupling layer has a thickness in a same scale as a thickness of at least one of the first electrically conductive layer, the ME layer, the FM layer, the middle layer, the SOC layer or the PMA layer.

17. The integrated circuit structure of claim 12, wherein the ferromagnetic material with perpendicular magnetic anisotropy includes at least one of:
    a heterostructure including MgO and one or more of: cobalt, or iron;
    a super lattice including cobalt and platinum; or
    a two-dimensional ferromagnetic material.

18. The integrated circuit structure of claim 12, wherein the ferromagnetic material with perpendicular magnetic anisotropy includes MgO at a side thereof further away from the SOC layer, and at least one of cobalt, boron or iron at a side thereof closer to the SOC layer.

19. An integrated circuit device assembly including:
    a printed circuit board; and
    a plurality of integrated circuit components attached to the printed circuit board, individual ones of the integrated circuit components including one or more integrated circuit dies, individual ones of the dies including: a plurality of logic devices, wherein individual ones of the plurality of logic devices include:
    a first electrically conductive layer;
    a layer including a magnetoelectric material (ME layer) on the first electrically conductive layer;
    a layer including a ferromagnetic material with in-plane magnetic anisotropy (FM layer) on the ME layer;
    a middle layer on the FM layer, the middle layer including one of a second electrically conductive layer or an in-plane ferromagnetic layer;
    a layer including a dielectric material on the middle layer (coupling layer);
    a layer including a spin orbit coupling material (SOC layer) on the coupling layer;
    a layer including a ferromagnetic material with perpendicular magnetic anisotropy (PMA layer) on the SOC layer;
    a first electrically conductive structure at one side of the PMA layer and electrically coupled thereto; and
    a second electrically conductive structure at an opposite side of the PMA layer electrically coupled thereto, wherein the first electrically conductive structure and the second electrically conductive structure face each other in a direction transverse to a direction of the perpendicular magnetic anisotropy of the PMA layer, the first electrically conductive structure and the second electrically conductive structure further together corresponding to an output of said individual ones of the plurality of logic devices.

20. The integrated circuit device assembly of claim 19, further including a first plurality of interconnects providing a cascaded electrical connection between successive ones of the plurality of the logic devices.

21. The integrated circuit device assembly of claim 19, wherein the PMA layer includes a sublayer including MgO.

22. The integrated circuit device assembly of claim 19, wherein the PMA layer at least partially vertically overlaps the FM layer.

23. A method of fabricating a logic circuit including:
depositing a first electrically conductive material layer on a substrate;
depositing a material layer including a magnetoelectric material (ME material layer) on the first electrically conductive material layer;
depositing a material layer including a ferromagnetic material with in-plane magnetic anisotropy (FM material layer) on the ME material layer;
depositing a second electrically conductive material layer on the FM material layer;
depositing a material layer including a dielectric material on the second electrically conductive material layer (coupling material layer);
depositing a material layer including a spin orbit coupling material (SOC material layer) on the coupling material layer;
depositing a material layer including a ferromagnetic material with perpendicular magnetic anisotropy (PMA material layer) on the SOC material layer;
performing a first etch process on the PMA material layer, the SOC material layer and the coupling material layer to form a first nanopillar, the first nanopillar including a PMA layer corresponding to the PMA material layer, a SOC layer corresponding to the SOC material layer, and a coupling layer corresponding to the coupling material layer; and
after the first etch process, performing a second etch process on the second electrically conductive material layer, the FM material layer, the ME material layer, and the first electrically conductive material layer to form a second nanopillar, the second nanopillar including a first electrically conductive layer corresponding to the first electrically conductive material layer, a ME layer corresponding to the ME material layer, a FM layer corresponding to the FM material layer, and a second conductive layer corresponding to the second conductive material layer.

24. The method of claim 23, further including:
providing a first electrically conductive structure at one side of the PMA layer and electrically coupled thereto; and
providing a second electrically conductive structure at an opposite side of the PMA layer electrically coupled thereto, wherein the first electrically conductive structure and the second electrically conductive structure face each other in a direction transverse to a direction of the perpendicular magnetic anisotropy of the PMA layer.

25. The method of claim 23, wherein the PMA layer fully vertically overlaps the FM layer.

* * * * *